United States Patent
Henzel et al.

(10) Patent No.: US 6,314,153 B1
(45) Date of Patent: Nov. 6, 2001

(54) PROCESS FOR INTRODUCING ZINC INTO A WATER-CONTAINING COMPONENT OF THE PRIMARY SYSTEM OF A NUCLEAR POWER PLANT

(75) Inventors: Norbert Henzel; Uve Reitzner, both of Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/520,281

(22) Filed: Mar. 6, 2000

Related U.S. Application Data

(63) Continuation of application No. PCT/EP98/05671, filed on Sep. 7, 1998.

(30) Foreign Application Priority Data

Sep. 9, 1997 (DE) .............................................. 197 39 361

(51) Int. Cl.$^7$ ..................................................... G21C 19/30
(52) U.S. Cl. ......................... 376/306; 376/305; 252/387; 252/389.52
(58) Field of Search .................................. 376/305, 306; 252/387, 389.52, 389.62, 388

(56) References Cited

U.S. PATENT DOCUMENTS

| | | | |
|---|---|---|---|
| 3,580,934 | 5/1971 | Murray et al. | 252/389 |
| 4,364,900 | * 12/1982 | Burrill | 376/306 |
| 4,756,874 | * 7/1988 | Ruiz et al. | 376/306 |
| 4,759,900 | * 7/1988 | Peterson et al. | 376/306 |
| 5,171,515 | * 12/1992 | Panson et al. | 376/306 |

FOREIGN PATENT DOCUMENTS

| | | | |
|---|---|---|---|
| 4018649 | * 12/1991 | (DE) | 252/389.52 |
| 44 25 902 A1 | 1/1996 | (DE) | 376/305 |
| 0 257 465 B1 | 3/1988 | (EP) | 376/306 |
| 0 281 672 | 9/1988 | (EP) | 376/305 |
| 0 338 769 | 10/1989 | (EP) | 376/305 |
| 0 599 619 A1 | 6/1994 | (EP) | 376/305 |
| 0 790 621 A1 | 8/1997 | (EP) | 376/305 |
| 61-093996 | * 5/1986 | (JP) | 376/306 |
| 61-095290 | * 5/1986 | (JP) | 376/306 |
| 62-106398 | * 5/1987 | (JP) | 376/306 |
| 2-190800 | * 7/1990 | (JP) | 376/306 |

OTHER PUBLICATIONS

Lister et al, Effects of Magnesium and Zinc Additives on Corrosion and Cobalt Contamination of Stainless Steels in Simulated BWR Coolant, Nuclear Technology, vol. 125, p. 316–331, Mar. 1999.*

* cited by examiner

*Primary Examiner*—Michael J. Carone
*Assistant Examiner*—Jack Keith
(74) *Attorney, Agent, or Firm*—Herbert L. Lerner; Laurence A. Greenberg; Werner H. Stemer

(57) ABSTRACT

Disclosed is a process for introducing zinc into a water-containing component of the primary system of a nuclear power plant, in particular for preventing the deposition of radioactive cobalt and/or for reducing the possible susceptibility of materials in the component to corrosion. An effective level of zinc is introduced into the component as a dissolved zinc compound which is a zinc complex and/or metal zincate.

15 Claims, No Drawings

PROCESS FOR INTRODUCING ZINC INTO A WATER-CONTAINING COMPONENT OF THE PRIMARY SYSTEM OF A NUCLEAR POWER PLANT c

CROSS-REFERENCE TO RELATED APPLICATION

This is a continuation of copending International Application PCT/EP98/05671, filed Sep. 7, 1998, which designated the United States.

BACKGROUND OF THE INVENTION

Field of the Invention

The invention relates to a process for introducing zinc into a water-containing component of the primary system of a boiling-water reactor or pressurized-water reactor nuclear power plant, in particular for establishing a zinc level to prevent the deposition of radioactive cobalt and/or to reduce the possible susceptibility of materials in the component to corrosion.

Such a water-containing component of a nuclear power plant can be the primary circuit of a boiling-water reactor or pressurized-water reactor plant.

Consequently, the feed may be delivered into a pipe which is linked into the primary part or is part of the primary part.

The water in the component may contain radioactive elements, such as radioactive cobalt. With time, these radioactive elements are incorporated in oxide layers which form on the internal surfaces of such a component. This results in sources of radioactive radiation in the oxide layers, entailing expensive protective measures when repair and maintenance work needs to be carried out on the component.

It is known from European Patent EP 0 257 465 B1 that the incorporation of radioactive cobalt into the oxide layers can be prevented if the element zinc is introduced into the water situated in the component. This is because zinc occupies positions in the oxide layers which would otherwise be taken up by the radioactive cobalt. The controlled introduction of zinc into the oxide layers considerably reduces the incorporation of radioactive cobalt.

Consequently, the sources of radioactive radiation in the oxide layers are advantageously reduced.

Moreover, zinc improves the protective properties of oxide layers on component surfaces, leading to a reduction in the possible susceptibility of materials forming the component to corrosion.

European Patent EP 0 257 465 B1 discusses the introduction of zinc in the form of zinc salt. However, it is established that the anions which enter the water, which is located in the component, together with the zinc salt damage the internal surface of the component. This is because the anions can have a corrosive effect on the internal surfaces of the component. Therefore, it is proposed in European Patent EP 0 257 465 B1 to introduce zinc oxide instead of a zinc salt into the water which is located in the component.

However, the solubility of zinc oxide in water is extremely low.

Consequently, feeding of zinc oxide is a complicated operation. It is necessary to form a slurry or to introduce the zinc oxide in portions, requiring a solid metering system. This is technically complex and susceptible to faults, owing to the tendency of the metering systems to become blocked.

Another possibility is for sintered zinc oxide pellets to flow through with a partial stream of the reactor feed water, but this option requires an expensive pressure-resistant and temperature-resistant passive metering installation.

Zinc can also be used to prevent corrosion. U.S. Pat. No. 3,580,934 has disclosed that corrosion of a water pipe can be prevented by forming a protective layer of silicate which contains zinc on the internal surface of the pipe. A zinc salt, but in particular a complex of a zinc salt with sulfamic acid, is used to form this protective layer. It is not possible to employ this technique in the nuclear part of a nuclear power plant, since it is not permitted to introduce a silicate into this area.

SUMMARY OF THE INVENTION

It is accordingly an object of the invention to provide a process for introducing zinc into a water-containing component of the primary system of a nuclear power plant that overcomes the above-mentioned disadvantages of the prior art devices and methods of this general type, and which can be carried out in an easily controllable and inexpensive manner and reliably prevents radioactive deposits in oxide layers on the internal surface of the component. In addition, it is intended to minimize or even prevent the possible susceptibility of materials forming the component to corrosion.

With the foregoing and other objects in view there is provided, according to the invention, a process for preventing the deposition of radioactive cobalt and/or for reducing the corrosion susceptibility of materials in a water-containing component of the primary system of a boiling-water reactor or pressurized-water reactor nuclear power plant, which comprises introducing an effective amount of zinc into said component as at least one soluble zinc compound selected from the group consisting of zinc complexes and metal zincates.

Quite modest levels of the zinc compound according to the invention are effective, in the range from 0.5 micrograms/liter (ppb) to 500 micrograms/liter (ppb).

This process provides the advantage that no damaging anions are introduced into the component, and moreover there is no need for a solids metering system. The incorporation of radioactive cobalt in oxide layers is reduced and, in addition, an improved resistance to corrosion is achieved for the material of the component.

This is because the introduction of zinc into an existing oxide layer on the internal surface of the component on the one hand reduces the incorporation of radioactive elements, e.g. cobalt, into this oxide layer and, on the other hand, also improves the properties of the oxide layer so that it provides an increased resistance to corrosion. Furthermore, the soluble zinc compounds do not introduce any disruptive anions into the water located in the component.

DESCRIPTION OF PREFERRED EMBODIMENTS

The soluble zinc compounds according to the invention are a zinc complex, for example a zinc/ammonia complex and/or a complex of zinc with a water-soluble basic amine, and/or a water-soluble metal zincate. An advantage of these compounds is that they are simple to prepare without any hazardous byproducts being formed. Water-soluble basic amines include, for example, methylamine, ethylamine, dimethylamine, ethanolamine, and ethylenediamine. Water-soluble zincates include, for example, barium zincate, cesium zincate, lithium zincate, potassium zincate, rubidium zincate, sodium zincate, strontium zincate, and thallium zincate. Zinc/ammonia complex and potassium zincate are preferred.

The soluble zinc compound according to the invention is dissolved in water and/or a water-miscible solvent such as methanol or ethanol. Water is preferred as least expensive and for avoiding the introduction of foreign materials.

The zinc/ammonia and/or zinc/amine complex is formed, for example, in a known way from zinc oxide and ammonia or the amine. The zincate is also formed in a known way from zinc oxide and the respective metal hydroxide. This hydroxide, for example, can be potassium hydroxide (KOH).

The zinc compound is suitably introduced in aqueous solution. This introduction can take place via an active metering system. An active metering system of this nature can be operated using a metering pump and can advantageously be fitted immediately upstream of or even within the primary system of boiling-water reactor or pressurized-water reactor nuclear power plants. This prevents the zinc from being deposited in a feed line leading to the primary system, for example in heat exchangers. A simple metering pump is sufficient, since the zinc compound is in completely dissolved form.

The aqueous zinc compound solution can be introduced continuously or discontinuously while the nuclear power plant is operating. In this way, it is possible to establish controlled desired concentrations.

The aqueous zinc compound solution can be introduced into the feed water immediately upstream of the reactor pressure vessel of a boiling-water reactor nuclear power plant. However, it can also be introduced into a reactor-water purifying device of a pressurized-water reactor or boiling-water reactor nuclear power plant. In each case, a feed point which is just upstream of the entry to the reactor pressure vessel is particularly suitable. In both cases, this has the advantage that the solution reaches the correct location substantially without losses.

By way of example, a zinc concentration of between 3 ppb and 20 ppb is established in the reactor water which is located in the component. This concentration range is particularly suitable for the desired purpose.

By way of example, the zinc in the soluble zinc compound has a natural isotope composition. Preferably, according to another example, the zinc in the zinc compound contains a depleted level of zinc-64. This provides the advantage of further reducing the sources of radioactive radiation in the oxide layers in the component. This is because a zinc-64 atom can become the radioactive zinc isotope zinc-65 by capturing a neutron. Consequently, instead of the radioactive cobalt-60, the radioactive zinc-65 could be incorporated in the oxide layers at some positions. However, even the introduction of undepleted zinc enables the radioactivity in the component to be reduced, since zinc-65 has a considerably shorter half life than cobalt-60. If the zinc in the zinc compound contains a depleted level of zinc-64, the amount of zinc-65 which may be present is also reduced.

The process according to the invention achieves the particular advantage that zinc can be introduced into the component of the nuclear power plant using simple yet precise means in order to reduce in that component radioactive deposits in the oxide layers of the container and, in addition, to reduce the possible susceptibility of the component material to corrosion.

We claim:

1. A process for preventing a deposition of radioactive cobalt and/or for reducing a corrosion susceptibility of materials in a water-containing component of a primary system of a boiling-water reactor or pressurized-water reactor nuclear power plant, which comprises introducing an effective amount of zinc into the component as at least one soluble zinc compound selected from the group consisting of zinc complexes and metal zincates.

2. The process according to claim 1, wherein the zinc compound is soluble in water.

3. The process according to claim 1, wherein the zinc complex is a complex of zinc with ammonia and/or a water-soluble basic amine.

4. The process according to claim 3, wherein the zinc/ammonia complex is formed from zinc oxide and ammonia and/or said water-soluble basic amine.

5. The process according to claim 1, wherein the zincate is formed from zinc oxide and a water-soluble metal hydroxide.

6. The process according to claim 5, wherein the hydroxide is potassium hydroxide (KOH).

7. The process according to claim 1, wherein the zinc compound is introduced in aqueous solution.

8. The process according to claim 7, wherein the aqueous solution of the zinc compound is introduced via an active metering system.

9. The process according to claim 7, wherein the aqueous solution is introduced continuously or discontinuously while the nuclear power plant is operating.

10. The process according to claim 7, wherein the aqueous solution is introduced into the feed water of a boiling-water reactor nuclear power plant immediately upstream of the reactor pressure vessel.

11. The process according to claim 7, wherein the aqueous solution is introduced into a reactor-water purifying device of a nuclear power plant.

12. The process according to claim 1, wherein the zinc level in the reactor water contained in the component is in the range from 3 ppb to 20 ppb.

13. The process according to claim 1, wherein the zinc in said zinc compound contains a depleted level of zinc-64.

14. The process according to claim 1, wherein said soluble zinc compound is zinc ammonia complex.

15. The process according to claim 1, wherein said soluble zinc compound is potassium zincate.

* * * * *